(12) United States Patent
Anderson et al.

(10) Patent No.: US 7,739,974 B1
(45) Date of Patent: Jun. 22, 2010

(54) SUBMERSIBLE OBJECT WITH ANTIFOULING PAINT CONFIGURATION

(75) Inventors: Kevin R. Anderson, Fond du Lac, WI (US); Christopher J. Misorski, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 12/204,926

(22) Filed: Sep. 5, 2008

(51) Int. Cl.
*B63B 59/00* (2006.01)
(52) U.S. Cl. ...................................... 114/222
(58) Field of Classification Search ............... 114/67 R, 114/222; 428/217, 334, 343, 354; 156/71
See application file for complete search history.

(56) References Cited

U.S. PATENT DOCUMENTS

| | | | |
|---|---|---|---|
| 4,074,742 A | 2/1978 | Chamblin | |
| 4,273,833 A * | 6/1981 | De Long | 114/361 |
| 5,281,267 A * | 1/1994 | Jones | 106/407 |
| 5,303,574 A | 4/1994 | Matossian et al. | |
| 5,403,390 A | 4/1995 | Spera et al. | |
| 5,468,532 A | 11/1995 | Ho et al. | |
| 5,603,161 A | 2/1997 | Welsh | |
| 5,697,329 A | 12/1997 | Bell et al. | |
| 6,237,723 B1 | 5/2001 | Salsman | |
| 6,607,826 B1 * | 8/2003 | Hatch | 428/343 |
| 6,922,916 B1 | 8/2005 | Potter | |
| 7,018,313 B2 | 3/2006 | Nakamura | |
| 7,341,777 B2 | 3/2008 | Takahashi et al. | |

FOREIGN PATENT DOCUMENTS

JP 2002284088 A * 10/2002

* cited by examiner

*Primary Examiner*—Lars A Olson
(74) *Attorney, Agent, or Firm*—William D. Lanyi

(57) ABSTRACT

Antifouling materials are used to provide first and second layers or coatings on a submersible object. The first and second layers are visually distinct from each other, such as being made of two distinct colors, so that the ablation of an outer layer will be evident when an inner layer is exposed to show a different color in the regions of ablation. The materials for the first and second layers can be chemically active to cause the antifouling nature of the materials or can be electrically conductive to permit their use in the creation of either chlorine bubbles on the wetted surface or a change in ionic characteristic of water in contact with the wetted surface.

12 Claims, 2 Drawing Sheets

SUBMERSIBLE OBJECT WITH ANTIFOULING PAINT CONFIGURATION

BACKGROUND OF THE INVENTION

1. Field of the Invention

The present invention is generally related to a submersible object, such as a marine drive unit, and, more particularly, to a configuration of layers of an antifouling substance which is applied in two steps to provide an indicative arrangement of visually distinct appearances that facilitate the detection of missing portions of an outer layer.

2. Description of the Related Art

Those skilled in the art of marine propulsion systems are aware of many different methods for discouraging the growth of marine organisms on surfaces of boats, marine drives, and other submerged devices such as grates and pipes used to conduct the flow of liquids below the surface of a body of water. Some systems use electrically energized surfaces to induce the creation of chlorine bubbles in sea water applications or induce changes in the ionic characteristics of water near surfaces in fresh water applications. In addition, many different types of antifouling paints and chemical coatings have been used to discourage the growth of marine organisms, such as barnacles, on submerged surfaces. In addition, combinations of different colors have been used as visual indicators in various applications where the wear or degradation of an outer surface can be detected by comparing the color of the outer surface to a different color of an underlying surface.

U.S. Pat. No. 4,074,742, which issued to Chamblin on Feb. 21, 1978, describes an indicator for tire wear patterns. A multilayer adhesive strip is adhered to the tread of an automobile or other vehicle tire transversely of the tread and generally axially of the wheel. Each layer has a different color and wear on one part of the strip faster than another will expose a different color or colors that will indicate the wear pattern.

U.S. Pat. No. 5,303,574, which issued to Matossian et al. on Apr. 19, 1994, describes an evaluation of the extent of wear of articles. An article, such as a piece of manufacturing tooling, is modified prior to use by treating a portion of its surface to be worn so that the treated surface worn more than a preselected amount has a different appearance than the treated surface worn less than the preselected amount, using a treatment process in which the treated surface is at least as wear resistant as the untreated surface.

U.S. Pat. No. 5,403,390, which issued to Spera et al. on Apr. 4, 1995, describes a cuprous sulfide marine antifouling paint. The paint includes the ingredient of cuprous sulfide or cupric sulfide, both of which offer a hostile surface to chelating algae while retaining a repellant effect on barnacles and mollusks. The antifoulant coating results in a colorfast surface and the preferred embodiment has been devised to have a stable black color.

U.S. Pat. No. 5,468,532, which issued to Ho et al. on Nov. 21, 1995, describes a multilayer graphic article with color layer. The article comprises a substrate, at least one color layer disposed on the substrate, and a protective surface layer that overlies the substrate and the color layer. The color layer is visible through the surface layer and comprises a color agent in a copolymeric binder. The binder comprises the copolymerization product of an olefinic monomer and a second monomer having a pendant carboxyl group.

U.S. Pat. No. 5,603,161, which issued to Welsh on Feb. 18, 1997, describes a wear indicating shaving strip and blade assembly for a shaver. The indicator may incorporate a shaving aid, such that the visual wear indicator corresponds to releasing shaving agents, wear or oxidation of a cutting edge. The visual wear indicator may include a shaving aid composite which exhibits a first color to the user during an initial use and a different color during a subsequent use, wherein the transition from the first color to the second color is designed to correspond to a predetermined parameter of the shaver.

U.S. Pat. No. 5,697,329, which issued to Bell et al. on Dec. 16, 1997, describes a color coded safety belt or harness to indicate the age thereof. The harness is to be worn by a person to protect the person from a fall. The belt or harness is formed of first fibers of a predetermined first color and also includes at least one color coded indicator fiber woven therein to indicate the year of the manufacturer of the belt or harness.

U.S. Pat. No. 6,237,723, which issued to Salsman on May 29, 2001, describes a quick check brake indicator. A visual brake wear indicator gauge for a vehicle's disc brake system is described. A mounting bracket is fixed to the existing brake's caliper with a hollow housing extending from the bracket. The visual gauge has an indicator bar with straight length and a right angled indicator foot on one end that contacts an inside disc pad. This indicator bar extends through and within the gauge housing and is normally biased by a housing spring to contact the brake's disc pad.

U.S. Pat. No. 6,922,916, which issued to Potter on Aug. 2, 2005, describes footwear with outsole wear indicator. The wear indicator includes a plurality of strata that each have different properties, such as color. As portions of an individual stratum are worn away, corresponding portions of an underlying stratum are revealed. The underlying strata may be worn away in a similar manner to reveal further strata, thereby providing a wearer with the ability to determine the amount of wear that has occurred in an outsole.

U.S. Pat. No. 7,018,313, which issued to Nakamura on Mar. 28, 2006, describes a sprocket with wear limit indication. In a sprocket for use with a roller chain, a wear limit marker, having a different color from that of the base material of the sprocket, is provided on a side surface of a sprocket tooth adjacent to a keyway. The wear limit marker is disposed on an imaginary line extending in the direction of the pressure angle, and is located in a hole or groove provided in a side surface of the sprocket tooth. The marker makes it possible to determine easily and reliably whether or not wear at the location at which wear of a sprocket tooth proceeds most rapidly is within a predetermined limit, and the location of the marker makes it possible to evaluate wear conditions even when the sprocket is installed in a machine.

U.S. Pat. No. 7,341,777, which issued to Takahashi et al. on Mar. 11, 2008, describes a coating for inspection of cracking in a structure. The coating layer has dispersed therein microcapsules with a visualizing liquid sealed therein. It is formed on the surface of the structure and when a crack is developed in the structure and propagated to the coating layer, the microcapsules dispersed in the coating layer are ruptured and the visualizing liquid flows out from the ruptured microcapsules and reaches the surface of the coating layer along the crack in the coating layer. This makes it possible to detect the occurrence of the crack in the structure.

The patents described above are hereby expressly incorporated by reference in the description of the present invention.

When a submersible object, such as a marine drive unit, is provided with an antifouling surface, two problems can occur. First, during manufacture, it is sometimes very difficult to determine whether or not the entire surface of the submersible object is properly coated with the antifouling substance. Secondly, after the submersible object is used, it is difficult to determine when the effectiveness of the antifouling surface has decreased sufficiently to require repair or recoating. It would therefore be significantly beneficial if an antifouling coating system could be provided in which, during manufacture, it is easy to tell whether or not the entire submersible surface of the object is adequately coated with the antifouling material and also make it possible, when in use, to determine if the submersible surface remains effectively coated with the antifouling material.

SUMMARY OF THE INVENTION

A submersible object, made in accordance with a preferred embodiment of the present invention, comprises a substrate, a first layer of a first antifouling material disposed on a surface of the substrate, and a second layer of a second antifouling material disposed on the first layer, wherein the first and second layers are visually distinct from each other.

In a preferred embodiment of the present invention, the first layer is a different color than the second layer and the second antifouling material is an ablative material. The first antifouling material can be a paint and the submersible is object can be a marine drive unit, such as the driveshaft housing and gear case of an outboard motor or a sterndrive unit. In a particularly preferred embodiment of the present invention, the first and second antifouling materials are made of generally the same material except for their visually distinct characteristic. In certain embodiments of the present invention, the substrate is aluminum. The second antifouling material can contain a chemical which discourages the growth of marine organisms on a wetted surface of the second layer.

BRIEF DESCRIPTION OF THE DRAWINGS

The present invention will be more fully and clearly understood from a reading of the description of the preferred embodiment in conjunction with the drawings, in which.

DESCRIPTION OF THE PREFERRED EMBODIMENT

Figure 1A:
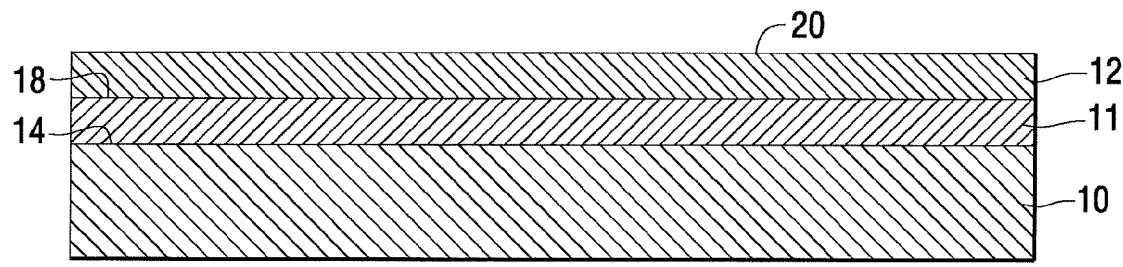
FIGS. 1A-1D show cross-sections of a submersible object in accordance with a preferred embodiment of the present invention.

Throughout the description of the preferred embodiment of the present invention, like components will be identified by like reference numerals.

Figure 1B:
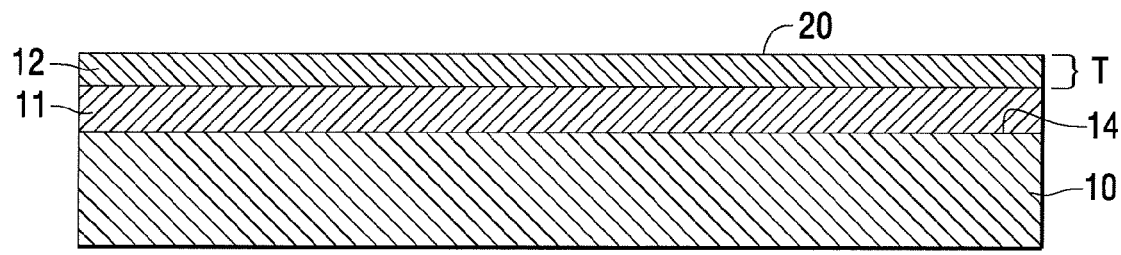

FIG. 1A is a simplified schematic view of a section of the submersible object made in accordance with a preferred embodiment of the present invention. It should be understood that FIGS. 1A-1B are enlarged section views drawn without regard to scale so that the various layers, or coatings, of antifouling paint can be more easily identified and clearly described. In FIG. 1A, a substrate 10 is shown with a first layer 11 of a first antifouling material disposed on a surface 14 of the substrate 10. A second layer 12 of a second antifouling material is disposed on the first layer 11. More precisely, the second layer 12 is disposed on an outer surface 18 of the first layer 11. The first and second layers, 11 and 12, are visually distinct from each other. In a particularly preferred embodiment of the present invention, the first layer 11 is a different color than the second layer 12.

The present invention will be described, in conjunction with FIGS. 1A-1B, in terms of two antifouling coatings, 11 and 12, with the first coating 11 being deposited directly on the outer surface 14 of the substrate 10. It should be understood, however, that an additional base coat 30 can be deposited on the outer surface 14 of the substrate 10 prior to the application of the first layer 11 as will be described in greater detail below in conjunction with FIG. 2.

With continued reference to FIG. 1A, the outer surface 20 of the second layer 12 is exposed to water when the submersible object is submerged. FIG. 1B represents the same structure as that shown in FIG. 1A, but after the submersible object has undergone a reduction in the thickness of the second layer 12. That thickness is identified by reference letter T in FIG. 1B. The reduction in thickness T can be caused in several ways. If the second layer 12 is an antifouling material which dissolves over time in the presence of water, the outermost layer 12 will gradually dissolve and reduce the thickness of the second layer 12. This may occur even if no significant erosive conditions exist that would wear away the outer surface 20 and reduce the thickness of the second layer 12. On the other hand, the use of certain antifouling materials on marine vessel hulls or the surfaces of marine drives can result in planned ablation of the second layer 12. If the antifouling material of the second layer 12 is used in conjunction with an electric current that induces the creation of chlorine bubbles on the outer surface 20, oxidation of carbon fibers or other electrically conductive particles in the second layer 12 can result in a thinning of that layer which would reduce dimension T shown in FIG. 1B. Regardless of the precise cause of the thinning of the second layer 12, it should be understood that the second layer can be reduced in thickness through its normal use as an antifouling material.

Figure 1C:
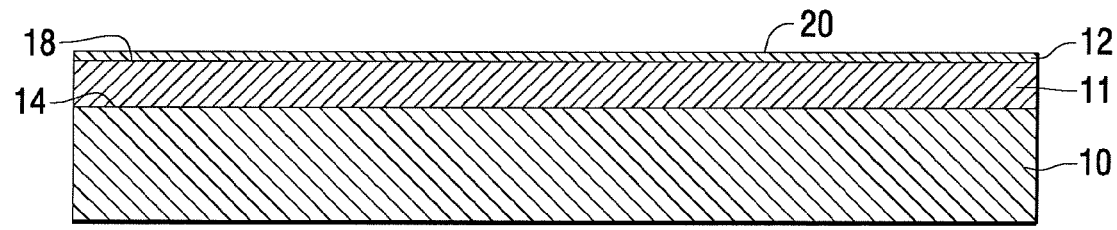

FIG. 1C shows a more dramatic thinning of the second layer 12 as compared to FIG. 1A or 1B. However, in FIG. 1C, the integrity of the second layer 12 remains intact and the outer surface 18 of the first layer 11 is not exposed. It would be expected that the condition shown in FIG. 1C would occur after a prolonged period of use.

Figure 1D:
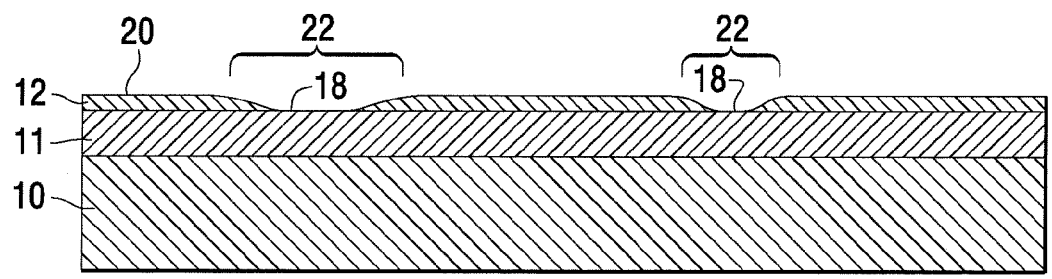

FIG. 1D shows the same structure that is described above in conjunction with FIGS. 1A-1C, but after a longer period of time than represented in FIG. 1C. The second layer 12 shows a greater degree of ablation than FIG. 1C, particularly in the regions identified by reference numerals 21 and 22. In fact, portions of the outer surface 18 of the first layer 11 are exposed as a result of the significant ablation of the second layer 12 in the areas identified by reference numerals 21 and 22. Since the first and second layers, 11 and 12, are visually distinct from each other in a preferred embodiment of the present invention, the exposure of surface 18 in regions 21 and 22 will be visually evident when the submersible object is viewed from a direction above the illustration in FIG. 1D. The different colors of the first and second layers, 11 and 12, will alert the viewer to the presence of wear or ablation in regions 21 and 22 because of the appearance of the color of the first layer 11, at surface 18, through the second layer 12. By the visual presence of the color of the first layer 18, in regions 21 and 22, within the surface 20 of the other color of the second layer 12, it is evident that repair or recoating of the substrate 10 is due.

With continued reference to FIGS. 1A-1D, the first and second layers, 11 and 12, can be made of the same antifouling material, but with a different color or other visually distinct characteristic being provided in order to allow the easy determination of the presence of ablated regions, such as those identified by reference numerals 21 and 22 in FIG. 1D. In a preferred embodiment of the present invention, both the first and second layers are made of an antifouling material so that the prevention of fouling by marine organisms can continue even after portions, 21 and 22, of the second layer 12 are absent.

Figure 2:
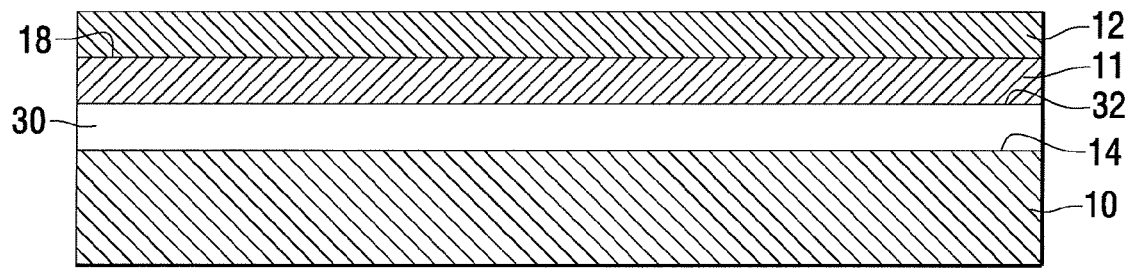
FIG. 2 shows a cross-section of a submersible object made in accordance with an alternative embodiment of the present invention.

FIG. 2 shows a substrate 10 with first and second layers, 11 and 12, as in the examples described above in conjunction with FIGS. 1A-1D. However, a base coat 30 is applied onto the outer surface of the substrate 10 before the application of the first layer 11. This base coat 30 can comprise a non-antifouling material and can serve the purpose of helping the first layer 11 to adhere to the substrate 10. It should be understood that the use of a base coat 30 is not required in all embodiments of the present invention. The sequence of application in the configuration shown in FIG. 2 would be the base coat 30, the first layer 11, and the second layer 12.

As described above, the use of two visually distinctive layers, 11 and 12, provides a helpful indication of the ablation or partial ablation of the second layer 12 in regions such as those identified by reference numerals 21 and 22 in FIG. 1D. However, the use of visually distinctive materials for the first and second layers also provides another very significant benefit. During the application process, such as on a paint line in a manufacturing facility, it sometimes becomes difficult to determine if an application of paint has adequately covered the surface of the component. If a second coat of paint is of a similar color to a first coat, it sometimes becomes extremely difficult to tell if a region has been missed during the application of the second coat. If the paint is used simply to protect the outer surface 14 of the substrate 10, the omission of the second coat in small regions may not be significantly deleterious to the operation of the device. However, when the use of the paint is for the purpose of providing an antifouling characteristic, and the first and second coats are the same color, the complete removal of the antifouling paint in localized regions will not be discovered until the outer surface 14 of the substrate is exposed to water and the inevitable growth of marine organisms. As a result, the operator of a boat would likely realize the localized absence of the antifouling paint only upon the occurrence of barnacles adhering to a boat hull or surface of a marine drive unit. That discovery would then result in the necessity of scraping and sanding the affected region prior to repainting it with antifouling paint. However, during the manufacturing process, the use of two antifouling paints of different colors allows the manufacturer to notice areas where an application coat of the antifouling paint was not applied. This allows the manufacturer to correct this oversight by continuing the painting process until none of the first layer color is visible.

With continued reference to FIGS. 1A-1D and 2, it is also beneficial if the first layer 11 is a different color than the substrate 10. In embodiments of the present invention that are made with a base coat 30 as described above in conjunction with FIG. 2, it is also beneficial if the base coat 30 is a different color than the substrate 10 and the first layer 11 is a different color than the base coat 30. Naturally, the second layer 12 should be a different color than the first layer 11.

Figure 3:
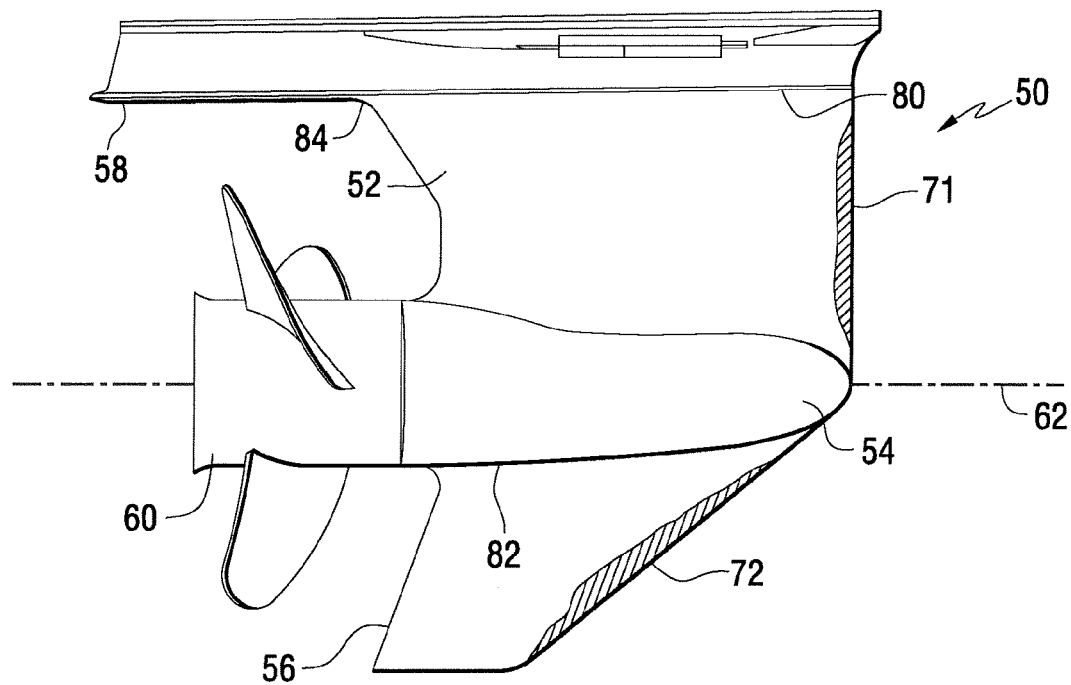
FIG. 3 shows a marine drive unit made in accordance with a preferred embodiment of the present invention.

FIG. 3 is a side view of a marine drive unit 50. The illustration in FIG. 3 is used as an example of a submersible object with which the present invention can be used. However, it should be understood that the present invention can be used in conjunction with other submersible objects, such as grates and other underwater devices. The marine drive unit 50 shown in FIG. 3 is the driveshaft housing 52 and gear case 54 of a sterndrive unit. It is shown with its skeg 56, anti-ventilation plate 58 and propeller 60 which is rotatable about a propeller shaft centerline 62. Two regions, 71 and 72, are drawn to show hypothetical wear areas on the surface of the drive unit 50. As a marine drive moves through the water, the leading edge 71 of the driveshaft housing and leading edge 72 of the skeg 56 are likely to experience a degradation of the second layer 12 described above in conjunction with FIGS. 1A-1D and 2, particularly if the second layer is made of an ablative material. If this type of ablation occurs, with the removal of portions of the second layer from the drive unit 50, the operator of a marine vessel can observe a different coloration in regions 71 and/or 72 compared to the color of the remaining surface of the drive unit. This will serve as a visual indication that the drive unit 50 should be recoated with an outer layer of antifouling paint at the vessel operator's first opportunity to do so. As described above, the use of the present invention also assists the manufacturer during the painting process. Certain regions of the outer surface of the drive unit 50 may present difficulty in assuring that an adequate coat of the second layer has been properly applied. As an example, portions of the region 80 under the anti-ventilation plate, certain portions of the surface of inside bends 84, and where the torpedo of the gear case 54 meets the generally flat surface of the skeg 56 at location 82, might present particular difficulty. However, if the second layer is a different color than the first layer, detection of missed regions can more easily be identified and corrected.

With continued reference to FIGS. 1A-1D, 2 and 3, it can be seen that a submersible object made in accordance with a preferred embodiment of the present invention comprises a substrate 10, a first layer 11 of a first antifouling material disposed on a surface of the substrate 10, and a second layer 12 of a second antifouling material disposed on the first layer 11, wherein the first and second layers are visually distinct from each other. The first layer 11, in a preferred embodiment of the present invention, is a different color than the second layer 12. The second antifouling material can be an ablative material. The first antifouling material is a paint in a preferred embodiment of the present invention. However, it should be understood that the first or second antifouling materials can alternatively be epoxy materials that are applied in ways other than by normal painting processes. These processes could include overmolding. In addition, it should be understood that certain embodiments of the present invention could use paint as both the first and second layers and, in a preferred embodiment of the present invention, both the first and second materials are antifouling materials. In addition, both the first and second antifouling materials can be ablative in nature. The submersible object can be a marine drive unit 50. The substrate can be aluminum. It should be understood that both the first and second antifouling materials can be made of generally the same material except for their visually distinct characteristic, such as their color. The second antifouling material can contain a chemical which discourages the growth of marine organisms on a wetted surface 20 of the second layer 12. In addition, the first antifouling material can contain a chemical which discourages the growth of marine organisms on a wetted surface 18 of the first layer, particularly when that surface 18 is exposed in certain regions, 21 and 22, as a result of the ablation of the second layer 12. Alternatively, it should be understood that the antifouling characteristic of the first and second layers, 11 and 12, can result from their use in an electrical process which causes the formation of chlorine gas bubbles on the wetted surfaces.

Although the present invention has been described with particular detail and illustrated to show preferred embodiments, alternative embodiments are also within its scope.

We claim:

1. An antifouling repair identification and continuing protection system for a submersible object, comprising a first layer disposed on said object, and a second layer disposed on said first layer, said first layer having a surface with at least one ablation-exposed region due to ablation of said second layer due to wear of said second layer over time, wherein all three of the following conditions are conjunctively satisfied:

a. each of said first and second layers comprises antifouling material; and
   b. said first and second layers are visually distinct from each other such that said ablation-exposed region of said surface of said first layer is visually evident through said second layer to positively identify a need for repair and also to precisely identify a location of ablation of said second layer for repair; and
   c. said first layer continues to protect said object from fouling including at said ablation-exposed region, notwithstanding ablation of said second layer at said region, until said repair can be attended to at a later time, whereby said object continues to be protected from fouling after said ablation has occurred and before repair can be accomplished.

2. The antifouling repair identification and continuing protection system according to claim 1 wherein said object includes a substrate, and said first layer is applied over said substrate.

3. The antifouling repair identification and continuing protection system according to claim 2 wherein said substrate includes a base coat deposited thereon, and wherein said first layer is applied over said base coat.

4. The antifouling repair identification and continuing protection system according to claim 1 wherein said first layer is a different color than said second layer.

5. The antifouling repair identification and continuing protection system according to claim 1 wherein said first layer comprises antifouling paint material, and said second layer comprises antifouling ablative material.

6. The antifouling repair identification and continuing protection system according to claim 1 wherein said first and second layers comprise first and second antifouling materials of the same material except for their visually distinct characteristic.

7. The antifouling repair identification and continuing protection system according to claim 1 wherein said second layer comprises antifouling material containing a chemical discouraging the growth of marine organisms on a wetted surface of said second layer.

8. The antifouling repair identification and continuing protection system according to claim 1 wherein said object is aluminum.

9. The antifouling repair identification and continuing protection system according to claim 1 wherein said object is a marine drive unit.

10. A method for identifying a need for and location of antifouling repair and providing continuing antifouling protection until such repair is accomplished, for a submersible object, comprising providing a first layer on said object, providing a second layer on said first layer, said first layer having a surface with at least one ablation-exposed region due to ablation of said second layer due to wear of said second layer over time, said method comprising performing all of the following:

a. providing each of said first and second layers with antifouling material; and
   b. providing said first and second layers visually distinct from each other such that said ablation-exposed region of said surface of said first layer is visually evident through said second layer, and visually observing and positively identifying the need for repair and also visually observing and positively identifying a precise location of ablation of said second layer for repair; and
   c. continuing to use said first layer to protect said object from fouling, including at said ablation-exposed region, notwithstanding ablation of said second layer at said region, until said repair can be attended to at a later time, whereby said object continues to be protected from fouling after said ablation has occurred and before repair can be accomplished.

11. The method according to claim 10 comprising providing said object with a substrate, and depositing said first layer on said substrate.

12. The method according to claim 11 comprising providing said substrate with a base coat deposited thereon, and applying said first layer over said base coat.

\* \* \* \* \*